A. H. S. SWAN.
COFFEE POT.
APPLICATION FILED NOV. 14, 1911.

1,031,486. Patented July 2, 1912.

Witnesses
Walter B. Payne
H. E. Stonebraker

Inventor
Alfred H. S. Swan
By
his Attorneys

UNITED STATES PATENT OFFICE.

ALFRED H. S. SWAN, OF ROCHESTER, NEW YORK, ASSIGNOR TO ROCHESTER STAMPING COMPANY, OF ROCHESTER, NEW YORK, A CORPORATION OF NEW YORK.

COFFEE-POT.

1,031,486.  Specification of Letters Patent.  Patented July 2, 1912.

Application filed November 14, 1911. Serial No. 660,223.

*To all whom it may concern:*

Be it known that I, ALFRED H. S. SWAN, of Rochester, in the county of Monroe and State of New York, have invented certain new and useful Improvements in Coffee-Pots; and I do hereby declare the following to be a full, clear, and exact description of the same, reference being had to the accompanying drawings, forming a part of this specification, and to the reference-numerals marked thereon.

My present invention relates to coffee pots and similar cooking utensils, comprising, generally, means for making an infusion by spraying water over the material while gradually increasing the temperature and permitting it to percolate therethrough, and it has for its object to provide a novel construction and arrangement of parts for accomplishing the desired end.

To these and other ends the invention consists in certain improvements and combinations of parts all as will be hereinafter more fully described, the novel features being pointed out in the claims at the end of the specification.

Figure 1:
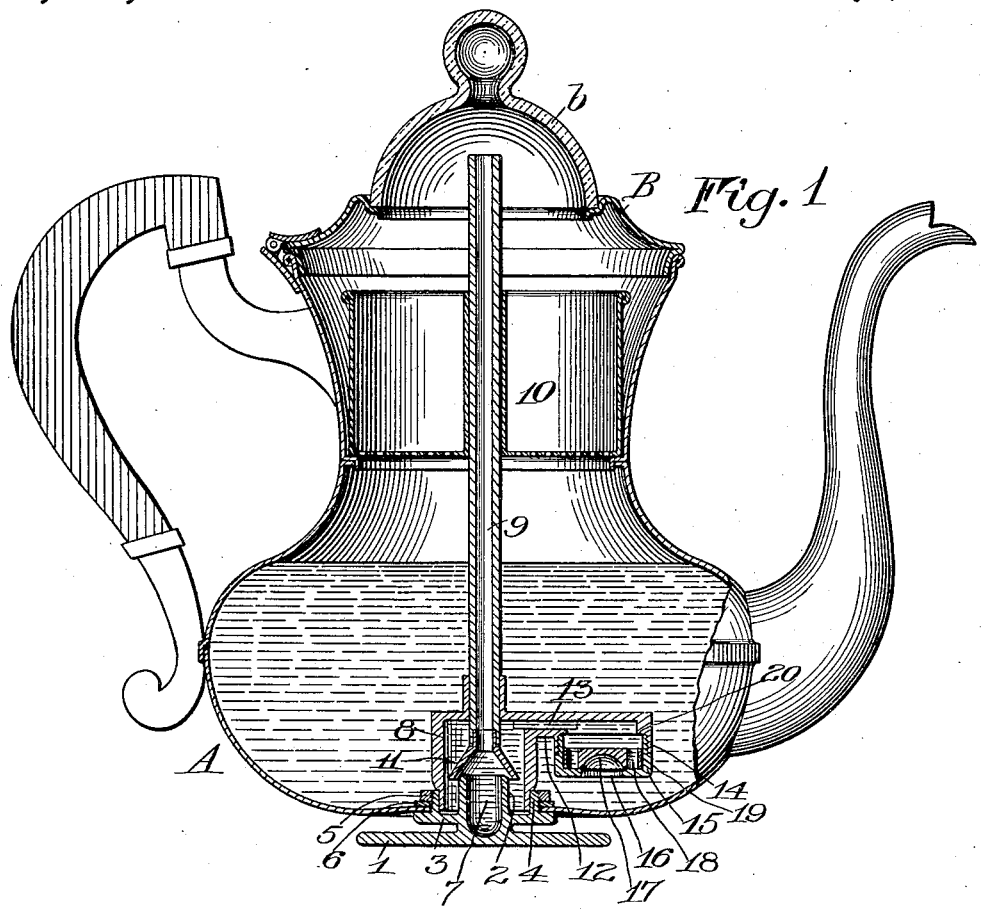
Figure 2:
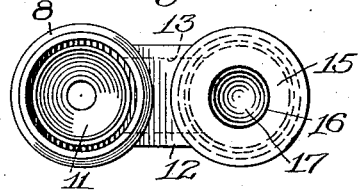
Figure 3:
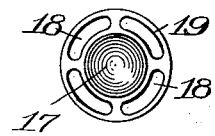

In the drawings: Figure 1 is a vertical sectional view of a coffee pot embodying my invention; Fig. 2 is a bottom plan view of the percolating mechanism, and Fig. 3 is a bottom view of the valve.

Similar reference numerals throughout the several figures indicate the same parts.

The present embodiment illustrates my invention as applied to a cooking vessel in the form of a coffee pot comprising a body-portion A having the usual opening adapted to be closed by a hinged cover including an annular rim B and a central dome *b*, the latter being constructed preferably of glass or other transparent material. The body-portion is arranged on the base 1 in a manner that will now be described, and to this end, the base is provided with the neck 2, preferably integral therewith, and about which is arranged the disk, or support, 3, the latter being disposed in spaced relation above the base 1, as shown. The body-portion A is provided with an opening centrally of its bottom to receive the threaded flange 4 formed on the support 3, the body-portion being held on said support by means of a clamping nut 5 and washer 6, respectively, which coöperate with the flange 4 already mentioned. The neck 2 affords a chamber 7 on the base, and it will be noted that the bottom of the chamber is in somewhat close proximity to the bottom of the base 1 so that the temperature of the liquid within said chamber will be raised quickly by application of heat to the base. The bottom of the chamber is preferably rounded, as shown, in order to effect the ready formation of gas or steam bubbles and their liberation from the bottom of the chamber. Further, the interior formation of the chamber permits the inflowing liquid to contact quickly with all parts of its surface. A suitable space is afforded between the neck 2 and the flange 4 for a purpose that will presently be apparent, said flange being suitably formed to receive the percolating mechanism that will now be described.

The percolating mechanism preferably comprises a casing 8, the lower end of which is adapted to be received within the flange 4. Extending vertically through the upper part of the casing 8 is the tube 9, the upper end of which is positioned near the top of the body-portion and above the perforated basket or receptacle 10 containing the coffee or other material from which the infusion is to be made. The lower end of the tube 9 is arranged at a point within the casing 8 and is provided with a funnel member or deflector 11 which is arranged above and surrounding the top of the neck 2. The deflector 11 is so arranged with relation to the chamber 7 and casing 8 that more or less restricted passages are formed therebetween causing the liquid to pass downwardly around the lower edge of the deflector, thence upwardly about the edge of the neck 2 and over the latter into the chamber 7. In order to control the passage of liquid into the casing 8, a gravity valve is provided, and to this end, the casing is provided with an extension 12 having a passage 13 formed therein and carrying a valve chamber which includes the threaded flange 14 and the cap 15 having a central opening 16 therein. The valve, which is circular, as shown, is held in operative position by the cap 15, and comprises a solid central portion 17, preferably cut away on its under face, as shown, and surrounded by a series of circumferentially arranged openings 18 and the rim 19, the latter being arranged for engagement with the inner wall of the cap 15 to insure the proper action of the valve, which is free to move vertically until it engages the shoulder 20.

In the operation of the device, the coffee pot is filled with water to about the level shown in Fig. 1, and the coffee or other material for making the infusion is arranged in the receptacle 10. The coffee pot being then placed on a suitable heating medium, the temperature of the liquid within the chamber 7 is quickly raised until the liquid is forced upwardly through the tube 9 and downwardly through the receptacle 10. As soon as this action is commenced, the valve is raised to permit the liquid to pass into the casing 8 through the passage 13, whence it moves first downwardly and then upwardly around the deflector 11, thence into chamber 7, from which point the action is repeated and continued until the infusion is found to be in its proper form.

I claim as my invention:

1. In a coffee pot, the combination with a base and a hollow neck thereon forming a heating chamber, of a support surrounding the neck and arranged in spaced relation to the base, a body-portion mounted on the support, a casing attached to the support, a tube extending from near the top of the body-portion to a point within the casing and carrying a deflector which surrounds the top of the said heating chamber, a valve casing, a hollow extension formed on the first mentioned casing and connecting the same with the valve casing, and a valve arranged within the valve casing.

2. In a coffee pot, the combination with a base and a hollow neck thereon forming a heating chamber, of a support surrounding the neck and arranged in spaced relation to the base, a body-portion mounted on the support, a casing attached to the support, a tube extending from near the top of the body-portion to a point within the casing and carrying a deflector which surrounds the top of the said heating chamber, a circular valve casing having an opening in the bottom thereof, a hollow extension formed on the first mentioned casing and connecting the same with the valve casing, and a circular valve arranged in said valve casing.

3. In a coffee pot, the combination with a base having a heating chamber formed thereon, of a body-portion mounted above the base, a casing arranged at the bottom of the body-portion and surrounding said heating chamber, a tube extending from near the top of the body-portion to a point within the casing and carrying a deflector which surrounds the top of said heating chamber, a valve casing, a hollow extension connecting the first mentioned casing with the valve casing, and a valve arranged in the valve casing.

ALFRED H. S. SWAN.

Witnesses:
RUSSELL B. GRIFFITH,
H. E. STONEBRAKER.

---

Copies of this patent may be obtained for five cents each, by addressing the "Commissioner of Patents, Washington, D. C."